Aug. 25, 1953  D. H. CLEWELL  2,649,781
AUTOMATIC MAPPING SYSTEM
Filed Sept. 3, 1947  2 Sheets-Sheet 1

INVENTOR
DAYTON H. CLEWELL
BY Sidney A. Johnson
ATTORNEY

Aug. 25, 1953

D. H. CLEWELL 2,649,781

AUTOMATIC MAPPING SYSTEM

Filed Sept. 3, 1947

INVENTOR
DAYTON H. CLEWELL
BY
ATTORNEY

Patented Aug. 25, 1953

2,649,781

UNITED STATES PATENT OFFICE 2,649,781

AUTOMATIC MAPPING SYSTEM

Dayton H. Clewell, Dallas, Tex., assignor, by mesne assignments, to Socony-Vacuum Oil Company, Incorporated, New York, N. Y., a corporation of New York Application September 3, 1947, Serial No. 771,997

5 Claims. (Cl. 33—141.5)

This invention relates to systems for automatically tracing the course of a vehicle on a map carried by it so that the position at any time, or the path of prior movement, of the vehicle may be ascertained by inspection of the map.

Though not limited thereto, the system is suited for installation on a car or truck used in geophysical prospecting so that data obtained in the field may be correlated with definite geographical positions or so that the vehicle may proceed expeditiously, even cross-country, to desired geographical locations within large areas to be explored for potential oil-bearing formations.

In accordance with the invention, the earth's magnetic field is utilized to produce an alternating current signal used to maintain fixed the orientation in space of one movable element of a system. A second element of the system is movable in accordance with the linear distance traveled by the vehicle, the two elements jointly determining and varying the relative position of the map and an associated stylus during progress of the vehicle.

In accordance with one form of the invention, the alternating signal is produced by an earth inductor compass; whereas in other forms of the invention the alternating current signal is produced by a flux-gate compass. In all forms of the invention, the phase relation of the signal produced by the inductor compass, magnetometer, or equivalent with respect to a second alternating current signal is used to control the position of a directional element effective to resolve the linear travel of the vehicle into its north-south and east-west components.

The invention further resides in systems having the features of combination and arrangement hereinafter described and claimed.

For more detailed understanding of the invention and for illustration of preferred forms thereof, reference is made to the accompanying drawings in which:

Fig. 1 schematically illustrates the essential mechanical and electrical components of an automatic mapping system using an earth-inductor compass;

Fig. 2 is an explanatory figure referred to in discussion of Fig. 1;

Fig. 3 schematically shows a phase-discriminator network usable in the system of Fig. 1;

Figure 1:
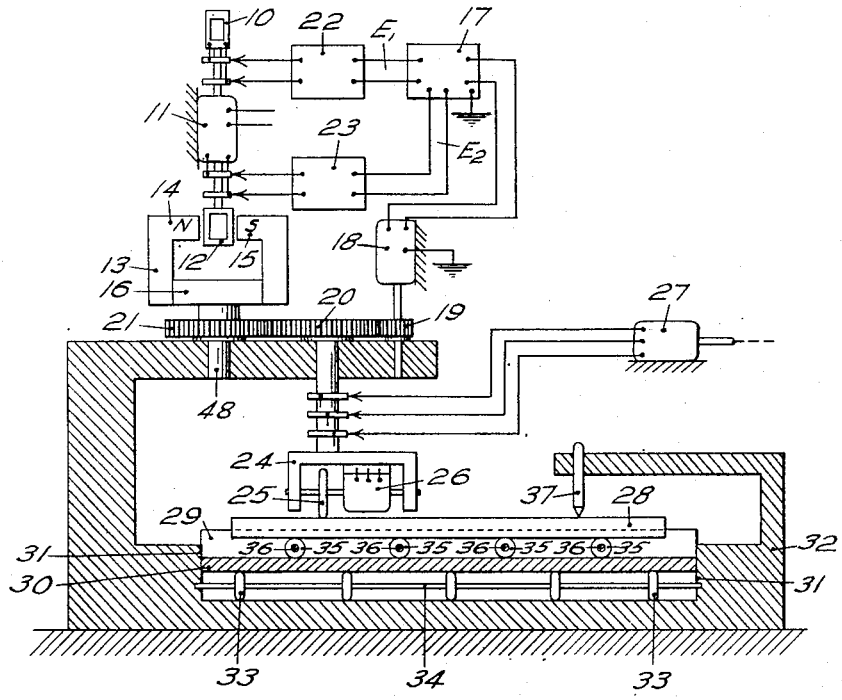

Referring to Fig. 1, the earth-inductor coil 10 is continuously rotated by a motor 11 suitably mounted in fixed position with respect to the frame of the car, truck or other vehicle whose course is to be traced or recorded on a chart or map. The coil 10 is so located as to be substantially clear of, or unaffected by, magnetic material or devices within or forming part of the vehicle or its equipment: the direction of the flux line of the earth's field in the vicinity of coil 10 should correspond with the true direction of the earth's field in the general neighborhood of the car or vehicle.

A coil 12, rotated continuously in synchronism with coil 10, is disposed in the field of a magnet 13 which for simplicity may comprise pole pieces 14—15 suitably attached to a permanent bar-magnet 16. The coils 10 and 12 may be mounted on the shaft of motor 11, but if necessary to avoid effect of local stray fields the coil 10 may be located at another more favorable position of the vehicle and the necessary synchronism between rotation of the coils obtained by a selsyn arrangement or equivalent servo-system.

Figure 2:
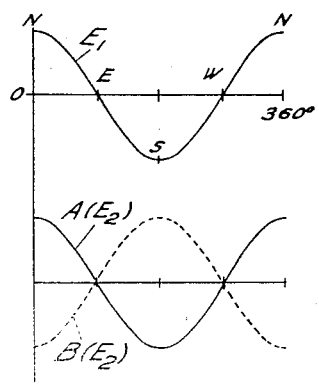

As the coils 10 and 12 rotate respectively in the magnetic fields of the earth and of the magnet 13, they each produce an alternating current voltage. As shown by curve $E_1$ of Fig. 2, the alternating voltage produced by the coil 10 reaches its maxima as the horizontal axis of the coil moves through north-south positions and has its minima as the axis of the coil passes through the east-west positions, and this is true regardless of the heading of the vehicle.

Assuming for the moment that the magnet 13 is at rest with respect to the vehicle, the phase of the alternating current output of coil 12 with respect to the phase of the alternating current output of coil 10 depends upon the heading of the vehicle. By way of example, assuming the horizontal axes of the coils 10 and 12 are in the same vertical plane, and a particular poling of the coil connections, the alternating outputs of the coils 10 and 12 may be 180° out of phase when the field between the pole tips 14 and 15 of magnet 13 is parallel to the earth's field and has the same polarity, that is, the north poles of the two fields are on like sides of the coils 10 and 12. This 180° phase relation of the two voltages is shown by curves $E_1$ and $B(E_2)$ of Fig. 2. When the magnet 13 is parallel to the earth's field but with reverse polarity, the two output voltages of the coils 10 and 12 are in phase, as shown by curves $E_1$ and $A(E_2)$ of Fig. 2. For each other intermediate angular position of the magnet 13, there is a corresponding unique phase relation between the two output voltages, the output voltage $E_2$ of coil 12 leading or lagging the output voltage $E_1$ of coil 10 in dependence upon the sense of relative displacement of the magnet 13 with respect to the earth's field, and the extent of the phase difference of the outputs being a function of the extent of the angular displacement of magnet 13.

The two alternating voltages $E_1$ and $E_2$ are impressed upon a phase-discriminator 17 of any suitable type, whose output is utilized to control a motor 18 which is suitably coupled as by gears 19, 20 and 21 to effect rotation of the magnet 13 about the rotational axis of coil 12. When, for example, the two voltages $E_1$ and $E_2$ are 180° out of phase, the output of the phase-discriminator 17 is essentially zero, and motor 18 remains at rest. So long as the vehicle heading remains that for which the voltages are out of phase, the magnet 13 therefore remains in fixed predetermined position in space with respect to the earth's field. As soon, however, as the heading of the vehicle is changed, there is a shift in phase between the two voltages $E_1$ and $E_2$ and motor 18 is energized to return the magnet 13 to its predetermined angular position with respect to the earth's field corresponding with null output of the discriminator. It is not essential that the discriminator 17 be of a type which has zero output when the input voltages are 180° out of phase: it is only necessary that the discriminator output be zero for a particular or unique phase-relation of the input voltages corresponding with a fixed position in space of the magnet 13 and a predetermined fixed angular relation between the horizontal axes of the coils 10 and 12.

Because the voltage output of the pickup coil 10 is inherently small, it is desirable to magnify it before impressing it on the phase-discriminator 17. The amplifier 22 interposed between the coil 10 and the phase-discriminator 17 for that purpose may be of any suitable type well known in the electronic art and uses a suitable number of amplifier stages to attain the desired high gain. The high-gain amplifier 22 should include peak-limiting or clipping arrangements, or is operated under saturated conditions affording inherent clipping action, so that the wave form of the voltage $E_1$ as impressed upon the phase-discriminator is essentially that of a pulse having steep sides so to afford increased sensitivity of the discriminator to shifts in phase, and will be independent of variations in the magnitude of the voltage induced in coil 10.

The output voltage of the coil 12 may be, and preferably is, also amplified and clipped as by amplifier 23 in order that the two voltages $E_1$ and $E_2$ as applied to the discriminator network 17 may be of the same amplitude and wave form.

In resetting the magnet 13 to its normal or reference position in space, the motor 18 also actuates a "direction" element 24 which, as more fully hereinafter explained, is effective in resolving the linear travel of the vehicle into its north-south and east-west components. In the preferred arrangement shown the directional element 24 supports a wheel or roller 25 rotated in accordance with the linear progress of the vehicle. The roller 25 may be directly coupled to a wheel of the vehicle, but is preferably mounted upon the shaft of a servo-motor 26 electrically connected to servo-generator 27 in turn mechanically coupled to one of the wheels of the vehicle or to an auxiliary trailer wheel. In any event, the rate of rotation of the wheel 25 corresponds with the speed of the vehicle, and the number of its revolutions over a given period of time therefore corresponds with the distance traveled by the vehicle during that time. For clarity, the roller or wheel 25 is consequently designated as the "distance" element of the mapping system.

The "direction" element and the "distance" element are jointly used automatically to effect, during travel of the vehicle, corresponding changes in the relative position of a map and an associated stylus 37 which may serve as an indicator, or a marking element, or both.

In the preferred construction shown, the driving wheel 25 frictionally engages a platform 28 to the upper surface of which is suitably attached a map or chart to be moved with respect to stylus 37. The platform 28, as viewed in Fig. 1, is free to move to the right or to the left, but is precluded from rotating or moving in any other direction by guides 29 extending upwardly from a second platform 30 which, as viewed in Fig. 1, is free to move into and out of the plane of the paper. Platform 30 is precluded from moving in other directions by the guides 31—31 which may be integral with the frame 32 of the apparatus. Preferably, the platform 30 rests upon a plurality of anti-friction rollers 33, or equivalent, spaced along a shaft 34 extending between the guides 31. There are a plurality of such shafts, suitably spaced and each having a group of spaced rollers 33, to permit the platform 30 freely to slide to and fro between the guides 31. Similarly, the platform 28 rests upon a series of groups of anti-friction rollers 35, each group of rollers being spaced along a shaft 36 extending between the guides 29 for platform 28.

When the horizontal axis of the "direction" member 24 is parallel to the longitudinal axis of platform 28, and therefore normal to the corresponding axis of platform 30, rotation of wheel 25 is effective to move the platform 30 in direction normal to the plane of the sheet, Fig. 1. Under this circumstance, the platform 28 and platform 30 both move with respect to the vehicle, but there is no change in relative position of the two platforms. Conversely, when the axis of the "direction" element 24 is at right angles to the position shown in Fig. 1, the rotation of the wheel 25 is effective to move the platform 28 to the right or left and with respect to platform 30 which remains at rest. For other positions of the "direction" element 24, the motion of the vehicle with respect to geographic north-south line is resolved into two mutually perpendicular components, and both platforms 28 and 30 move with respect to each other and with respect to frame 32 in accordance with the magnitudes and senses of those components. Consequently the geographic position of the vehicle may at any time be ascertained by looking at the relation between the map and the associated stylus 37 carried by the frame 32; in addition, and assuming the stylus 37 is a marking element, the path taken by the vehicle is traced upon the map.

Figure 3:
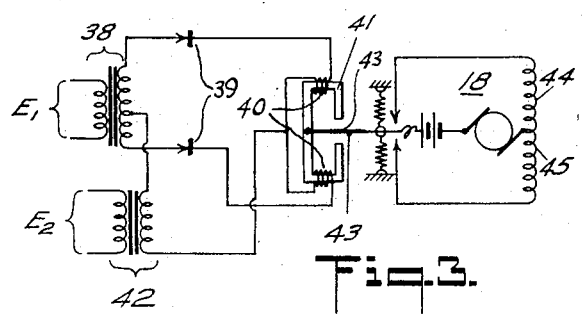

As an example of a phase-discriminator network suited for controlling the positioning motor 18 in accordance with phase relations of the voltages $E_1$ and $E_2$ of coils 10 and 12, reference is made to Fig. 3. One of the voltages, voltage $E_1$ for example, may be impressed upon the primary winding of a transformer 38 whose output terminals are connected through a rectifier bridge or demodulator network 39 to the coil system 40 of a relay 41. The other voltage, specifically voltage $E_2$ in the example assumed, is impressed upon the primary winding of a transformer 42 whose secondary terminals are respectively connected to taps of the secondary winding of transformer 38 and the coil 40 of relay 41. The rectifiers of the bridge 39 are so poled that when the voltages $E_1$ and $E_2$ are in phase, direct current flows through one of the coils of relay 41; whereas when they are 180° out of phase, the current flows through the other coil of relay 41. The armature 43 of the relay 41 therefore deflects in one direction or the other from its neutral position selectively to energize one or the other of the field coils 44—45 of motor 18 to effect its rotation in proper direction to restore the magnet 13 to the position corresponding with average null or balanced output of the discriminator 17. With this particular discriminator arrangement, there is null effective output when the voltages $E_1$ and $E_2$ are 90° out of phase as the currents in relay coils are effectively in balance; accordingly, if the mechanical portion of the apparatus is so designed that the reference position of the magnet 13 is the north-south position, the horizontal axes of the coils 10 and 12 should be at right angles to each other. If they are parallel to each other, this type of discriminator may be used provided a 90° phase shifter is interposed between it and the source of one or the other of the voltages $E_1$ and $E_2$.

Figure 4:
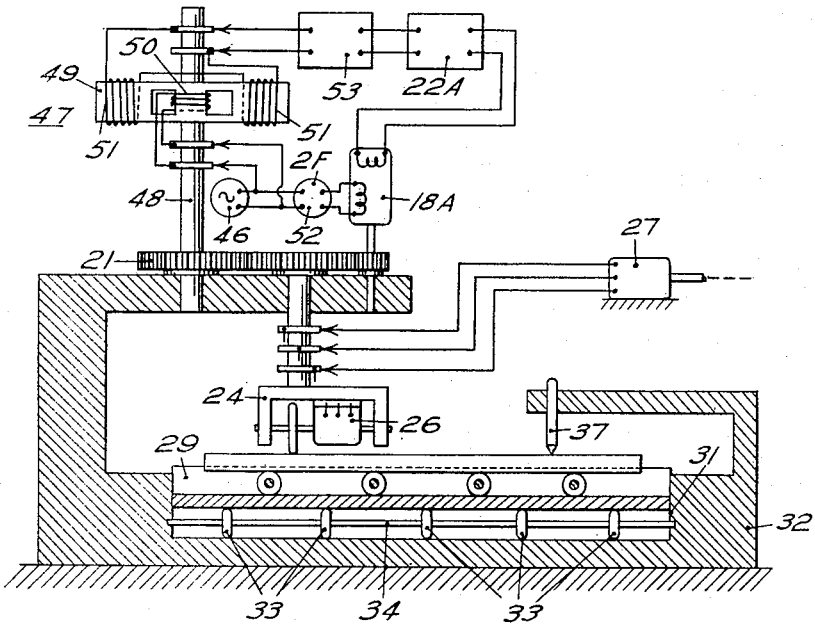
Fig. 4 is a modification of Fig. 1 using a flux-gate compass.

In the modification shown in Fig. 4, components having the purpose and function of components appearing in Fig. 1 are identified by like reference characters. In general, only those components not appearing in Fig. 1 are hereinafter specifically discussed.

In this modification, one winding of the motor 18A for positioning the directional element 24 is energized by the output of an amplifier 22A upon which is impressed the alternating voltage produced by a flux-gate compass 47 supported upon the shaft 48 of gear 21. The other winding of motor 18A is energized from the alternating current source 46 through the frequency-doubler 52 which may be of any suitable type. The compass comprises a core structure 49 of suitable magnetic alloy, such as Mumetal, Permalloy, or the like, whose alternating flux permeability is substantially affected by unidirectional flux having field strength of the same order as that of the earth. The percentage composition of suitable Mumetal may be approximately 75% nickel, 15% iron, 5% copper and small percentages of manganese, chromium, silicon and/or other elements. The coil 50 of the compass is energized with alternating current, from the alternating-current source 46, whose peak values are sufficient to saturate the core. The pickup coils 51 of the magnetometer are connected in series to provide an input voltage for the amplifier 22A. The frequency of this voltage is twice that of the source 46; any fundamental frequency component of the output of coils 51 is greatly attenuated by the filter 53 interposed between the compass and the amplifier.

When the horizontal axis of the core member 49 is normal to the earth's field, the component of the earth's field along the core is zero and the voltage output of the pick-up coils 51, 51 is zero. Under this circumstance, only one winding of motor 18A is energized and it therefore remains at rest. For other angular positions of the core member 49, a component of the earth's field is resolved parallel to the magnetically saturable axis of core member 49. For angular positions in one direction from normal, the above component of the earth's field will add to the flux from coil 50 during alternate half-cycles of the exciting voltage applied thereto and cause saturation earlier in those half-cycles. This unbalances the coupling to pick-up coils 51—51, and a second harmonic signal is developed which is in-phase with the output from frequency-doubler 52 and which phase is representative of the particular sequence of half-cycles in which the flux from the earth's component aids the flux from coils 51—51. For angular positions in the other direction from normal, flux addition and earlier saturation of core member 49 occur during the oppositely polarized sequence of alternate half-cycles. The resulting unbalance again develops a second harmonic signal in coils 51—51, but this signal is out-of-phase with the first-developed signal, and hence out-of-phase with the voltage from frequency-doubler 52. The double-frequency output of the pick-up coils 51, 51, applied to one winding of the motor 18A after amplification, is of magnitude increasing with increasing deviation of the core member from normal position and is in-phase or out-of-phase with respect to the output voltage of the frequency-doubler 52, applied to the other winding of motor 18A, in dependence upon the sense of the deviation.

Motor 18A is a two-phase type whose direction of rotation is determined by the phase relation of the alternating voltages respectively applied to the two-field windings and productive of a magnetic field rotating in one direction or the other in dependence upon the phasing of the field-excitations. Hence, the rotor of motor 18A will discriminate in its motional response between field-excitation voltages that are in-phase and out-of-phase, performing the function of a phase-discriminator plus the function of a motor.

Consequently as the vehicle in which the system is mounted moves along and takes various headings, the compass member 49 is maintained in an east-west position under control of the reversible two-phase motor 18A which is effective, concurrently with its re-setting adjustments of member 49, to move the "direction" member 24 for control of the relative position of the map and stylus 37.

Figure 6:
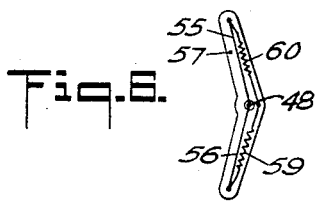
Fig. 6 is a plan view of parts appearing in Fig. 5.
Figure 7:
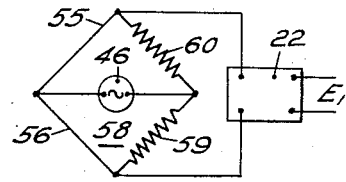
Fig. 7 shows a balanceable network comprised in the system of Fig. 5.
Figure 5:
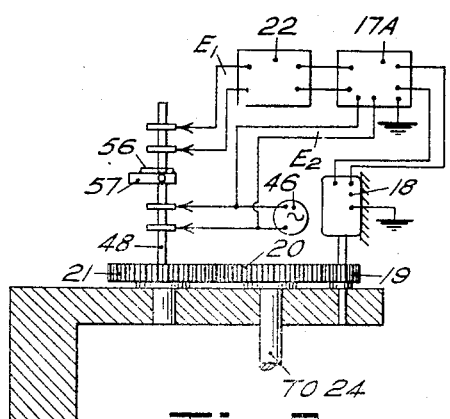
Fig. 5 is a modification of Fig. 4 using another type of magnetometer.

The modification shown in Figs. 5, 6 and 7 is similar to that of the preceding figures, particularly Fig. 4. In this modification, the detector element for producing an alternating current of phase and magnitude determined by the angular position of the element with respect to the earth's field comprises a pair of wires 55, 56, of a suitable alloy such as Mumetal, whose alternating current resistance is a function of their angular position with respect to the earth's field. The two wires are suitably mounted on a supporting structure 57 for rotation by shaft 48, Figs. 5, 6, and are electrically connected for inclusion in a balanceable electrical network 58 which may be a Wheatstone bridge including, as other arms, the resistors 59, 60 of metal whose resistance is substantially unaffected by the earth's magnetic field.

The input terminals of the network are connected to the source 46 of alternating current and the output of the network, preferably after amplification by amplifier 22 of any suitable type, is impressed on the phase-discriminator.

As the structure 57 rotates from its normal position, Fig. 6, to increase the angle between one of the wires 55, 56 and the earth's field F and concurrently to decrease the angle between the other of the wires and the earth's field F, the alternating current resistances of the wires are differentially changed to unbalance the network 58 in sense dependent upon the direction of rotation of member 57 from normal position.

Accordingly each time the vehicle heading is changed, the motor 18, under control of the phase-discriminator 17A, returns the member 57 to its normal position in space, corresponding, of course, to a new position with respect to the vehicle, and actuates the "direction" member 24 for the same purpose as in the modifications previously described.

It shall be understood the invention is not limited to the particular arrangements described, but that changes and modifications may be made within the scope of the appended claims.

What is claimed is:

1. In an automatic system for effecting relative movement between a stylus and a map support to indicate the position of a vehicle and to trace its course, an azimuth-sensitive detector, circuit elements and a controlled element energized by said detector in response to azimuthal motion thereof with respect to the earth's field rotationally to orient said detector and said controlled element on a predetermined azimuth heading, a wheel mounted on said controlled element with a diameter of said wheel substantially coincident with the axis of rotation of said controlled element and with the plane of said wheel aligned with said predetermined azimuth heading, and a motor mounted on said controlled element continuously to drive said wheel in accordance with forward and reverse motions of the vehicle, said wheel being coupled to the map support to drive it in radial motion about the axis of said controlled element on the azimuthal heading determined by said detector, whereby a polar-coordinated plot of the vehicle's position and course of movement is produced.

2. A mapping arrangement as in claim 1 in which the azimuth-sensitive detector comprises a magnet and a pair of coils rotatable in synchronism, one in the field of said magnet and the other in the earth's field; and in which the circuit elements energized by the detector comprise a phase-discriminator upon which the alternating current outputs of said coils are impressed, and a motor controlled by the output of said discriminator to maintain for different headings of the vehicle a predetermined fixed relation of said magnet to the earth's field.

3. A mapping arrangement as in claim 2 which additionally includes an amplifier-clipper in circuit with said detector and said discriminator for effecting similarity of the amplitudes and waveforms of the outputs of said coils as impressed upon the discriminator.

4. A mapping arrangement as in claim 1 in which the azimuth-sensitive detector comprises a balanceable network including resistors whose alternating current resistance varies as a function of their angular position with respect to a unidirectional magnetic flux, structure for supporting said resistors for rotation in the earth's field, and a source of alternating current connected to the input terminals of said network; and in which the circuit elements energized by the detector comprise a phase-discriminator connected to said source and upon which is also impressed any unbalanced output of said network, and a motor controlled by the output of said discriminator for maintaining fixed, notwithstanding different headings of the vehicle, the position of said structure with respect to the earth's field.

5. A mapping arrangement as in claim 1 in which the azimuth-sensitive detector comprises a flux-gate magnetometer mounted for rotation in the earth's field and a source of alternating current for energizing the exciting coils of said magnetometer, and in which the circuit elements energized by the detector comprise a phase-discriminator connected to said source and upon which is also impressed the output of the pick-up coils of said magnetometer, and a motor controlled by the output of said magnetometer for maintaining fixed, notwithstanding different headings of the vehicle, the position of said magnetometer with respect to the earth's field.

DAYTON H. CLEWELL.

References Cited in the file of this patent

UNITED STATES PATENTS

| Number | Name | Date |
|---|---|---|
| 481,432 | Soler | Aug. 23, 1892 |
| 1,401,242 | Lavaud | Dec. 27, 1921 |
| 1,427,267 | Lavaud | Aug. 29, 1922 |
| 1,746,420 | Fung | Feb. 11, 1930 |
| 1,774,458 | Tear | Aug. 26, 1930 |
| 1,785,241 | Bates | Dec. 16, 1930 |
| 1,946,710 | Pickard | Feb. 13, 1934 |
| 2,047,609 | Autranikan | July 14, 1936 |
| 2,053,154 | La Pierre | Sept. 1, 1936 |
| 2,149,440 | Jackson | Mar. 7, 1939 |
| 2,308,566 | Noxon | Jan. 19, 1943 |
| 2,313,682 | Stuart, Jr. | Mar. 9, 1943 |
| 2,361,433 | Stuart | Oct. 31, 1944 |
| 2,369,922 | Shamah | Feb. 20, 1945 |
| 2,383,459 | Beach | Aug. 28, 1945 |